(12) United States Patent
Dai et al.

(10) Patent No.: US 8,009,818 B2
(45) Date of Patent: Aug. 30, 2011

(54) METHOD FOR PROCESSING INCOMING CALL

(75) Inventors: Lung Dai, Taipei Hsien (TW); Bang-Sheng Zuo, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 22 days.

(21) Appl. No.: 12/566,689

(22) Filed: Sep. 25, 2009

(65) Prior Publication Data

US 2010/0260329 A1  Oct. 14, 2010

(30) Foreign Application Priority Data

Apr. 8, 2009  (CN) .......................... 2009 1 0301436

(51) Int. Cl.
*H04M 3/42*  (2006.01)

(52) U.S. Cl. .............. 379/189; 379/201.01; 379/207.02; 379/207.08; 379/207.09; 379/207.1; 455/414.1

(58) Field of Classification Search ............. 379/201.01, 379/207.02, 207.03, 207.08, 207.09, 207.1, 379/207.16, 189
See application file for complete search history.

(56) References Cited

U.S. PATENT DOCUMENTS 5,475,737 A * 12/1995 Garner et al. .............. 379/88.26
5,544,241 A *  8/1996 Dibner et al. ............. 379/373.01

* cited by examiner

*Primary Examiner* — Harry Hong
(74) *Attorney, Agent, or Firm* — Altis Law Group, Inc.

(57) ABSTRACT

A method for processing an incoming call using a communication device includes following steps. A phone number of the incoming call is detected. The phone number of the incoming call is logged. A ring duration of the incoming call is computed. The ring duration of the incoming call is compared with a predetermined time interval. If the ring duration of the incoming call is shorter than the predetermined time interval, related features are invoked thereby the incoming call is not returned.

14 Claims, 2 Drawing Sheets

METHOD FOR PROCESSING INCOMING CALL

BACKGROUND

1. Technical Field

The present disclosure relates to communicating technologies, and particularly to a method for processing an incoming call.

2. Description of Related Art

In general, if an incoming call is not answered, a communication device will log a missed call, the log of the missed call may include a phone number of a caller, such that the missed call can be returned conveniently.

However, there are scams using the missed call feature. When returning the missed call, the called number maybe a toll number having a pre-recorded message resulting in the calling number being charged a toll or a fee for making the call. Therefore, an improved method for processing incoming calls is desired.

DETAILED DESCRIPTION

Figure 1:
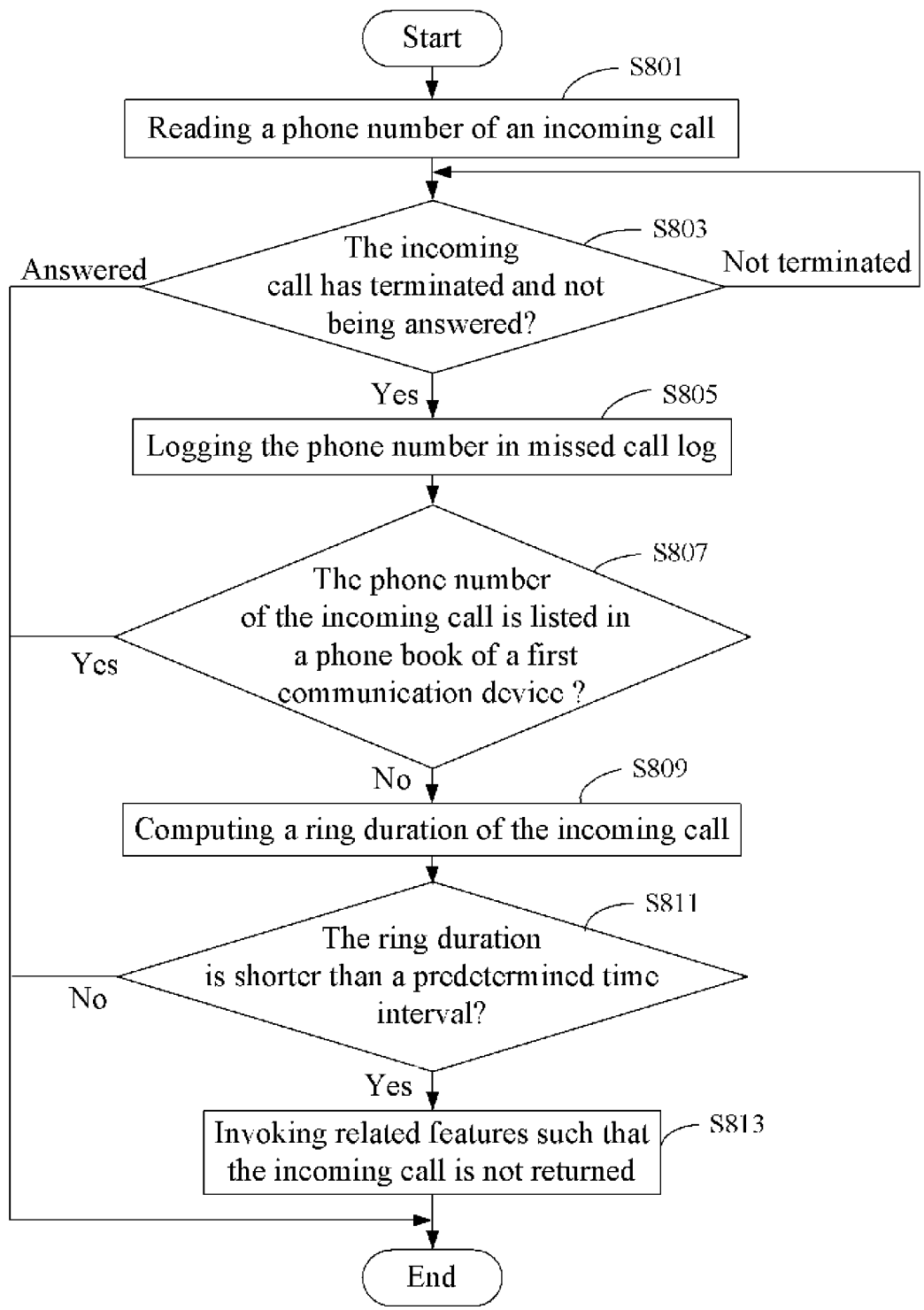
FIG. 1 is a flowchart of a method for processing incoming calls in accordance with an exemplary embodiment.
Figure 2:
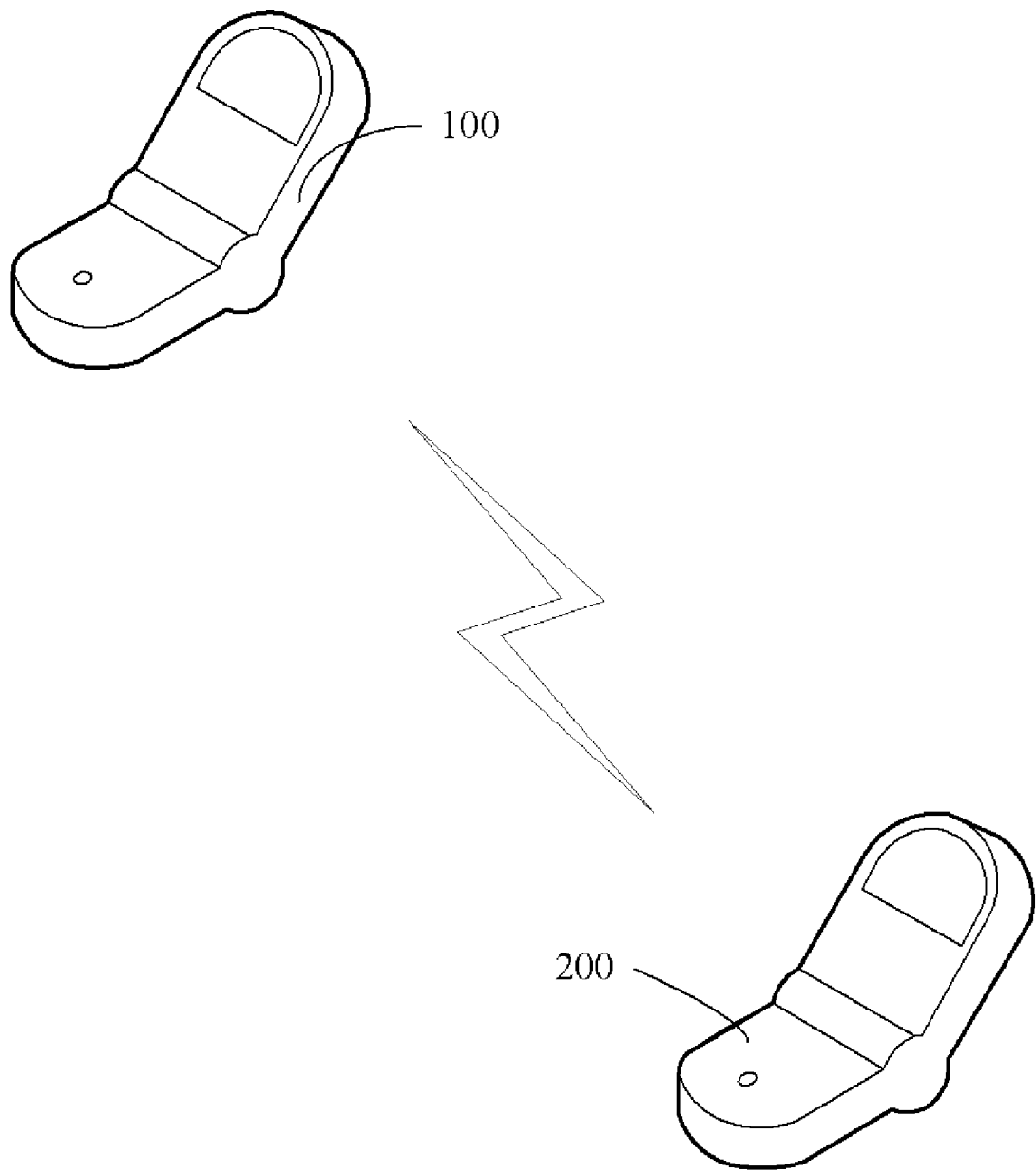
FIG. 2 is a schematic view of a system implementing the method of FIG. 1 in accordance with an exemplary embodiment.

Referring to FIGS. 1-2, a method for processing an incoming call may be implemented by a first communication device 100 in the form of program codes or instructions. The first communication device 100 may be a cell phone or a personal digital assistant (PDA) with communication functions or others. When receiving an incoming call from a second communication device 200, the first communication device 100 executes the program codes to implement the method. The method includes following steps.

In step S801, detecting a phone number of the incoming call.

In step S803, detecting if the incoming call has terminated and not being answered. If the incoming call has terminated and not being answered, step S805 is implemented. If the incoming call has not terminated, the procedure returns to step S803. If the incoming call is answered, the procedure is finished.

In step S805, logging the phone number in missed call log.

In step S807, searching the phone book of the first communication device 100 for the phone number. If the phone number of the incoming call is listed in the phone book of the first communication device 100, the procedure is finished. If the phone number of the incoming call is not listed in the phone book of the first communication device 100, step S809 is implemented.

In step S809, computing a ring duration of the incoming call.

In step S811, comparing the ring duration with a predetermined time interval. If the ring duration is at least the predetermined time interval, the procedure is finished. If the ring duration is shorter than the predetermined time interval, step S813 is implemented. The predetermined time interval can be predetermined according to user preference, such as one second.

In step S813, invoking related features such that the incoming call is not returned. In one embodiment, the related features may be displaying textual information alerting not to return the incoming call, or deleting the phone number of the incoming call such that the incoming call cannot be returned.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A method for processing an incoming call using a first communication device, the method comprising:
   detecting a phone number of a second communication device of the incoming call;
   logging the phone number of the incoming call;
   computing a ring duration of the incoming call;
   comparing the ring duration of the incoming call with a predetermined time interval; and
   if the ring duration of the incoming call is shorter than the predetermined time interval, the first communication device displaying textual information alerting not to return the incoming call.

2. The method according to claim 1, further comprising:
   judging whether the phone number of the incoming call is listed in a phone book of the first communication device; and
   if the phone number of the incoming call is not listed in the phone book of the first communication device, logging the phone number in missed call log is implemented.

3. The method according to claim 1, further comprising:
   judging whether the incoming call has terminated and not being answered; and
   if the incoming call has terminated and not being answered, logging the phone number in missed call log is implemented.

4. The method according to claim 3, further comprising:
   if the incoming call has not terminated, judging whether the incoming call has terminated and not being answered is further implemented.

5. The method according to claim 1, wherein the predetermined time interval is predetermined according to user preference.

6. The method according to claim 5, wherein the predetermined time interval is one second.

7. A method for processing an incoming call using a first communication device, the method comprising:
   detecting a phone number of a second communication device of the incoming call;
   judging whether the incoming call has terminated and not being answered;
   if the incoming call has terminated and not being answered, logging the phone number of the incoming call;
   judging whether the phone number of the incoming call is listed in a phone book of the first communication device;
   if the phone number of the incoming call is not listed in the phone book of the first communication device, computing a ring duration of the incoming call;
   comparing the ring duration of the incoming call with a predetermined time interval; and
   if the ring duration of the incoming call is shorter than the predetermined time interval, the first communication device displaying textual information alerting not to return the incoming call.

8. The method according to claim 7, further comprising:
if the incoming call has not terminated, judging whether the incoming call has terminated and not being answered is further implemented.

9. The method according to claim 7, wherein the predetermined time interval is predetermined according to user preference.

10. The method according to claim 9, wherein the predetermined time interval is one second.

11. A method for processing an incoming call using a first communication device, the method comprising:
- detecting a phone number of a second communication device of the incoming call;
- judging whether the incoming call has terminated and not being answered;
- if the incoming call has terminated and not being answered, logging the phone number of the incoming call;
- judging whether the phone number of the incoming call is listed in a phone book of the first communication device;
- if the phone number of the incoming call is not listed in the phone book of the first communication device, computing a ring duration of the incoming call;
- comparing the ring duration of the incoming call with a predetermined time interval; and
- if the ring duration of the incoming call is shorter than the predetermined time interval, the first communication device deleting the phone number of the incoming call such that the incoming call cannot be returned.

12. The method according to claim 11, further comprising:
if the incoming call has not terminated, judging whether the incoming call has terminated and not being answered is further implemented.

13. The method according to claim 11, wherein the predetermined time interval is predetermined according to user preference.

14. The method according to claim 13, wherein the predetermined time interval is one second.

* * * * *